United States Patent [19]
Curzon et al.
[11] Patent Number: 4,756,839
[45] Date of Patent: Jul. 12, 1988

[54] FIRE EXTINGUISHING COMPOSITION

[76] Inventors: Jon L. Curzon, 3331 Romelie Dr., Atlanta, Ga. 30340; Conrad S. Mikulec, 2400 NE. 26th St., Fort Lauderdale, Fla. 33305

[21] Appl. No.: 12,264

[22] Filed: Feb. 9, 1987

Related U.S. Application Data

[63] Continuation-in-part of Ser. No. 843,763, Mar. 26, 1986, abandoned.

[51] Int. Cl.[4] .......................... A62D 1/00; C09K 3/00; A62C 1/00; A62C 3/00

[52] U.S. Cl. .......................................... 252/2; 169/46; 169/65; 252/7; 252/382; 252/388; 252/396; 252/602

[58] Field of Search ...................... 252/2, 3, 7, 8, 601, 252/602, 609, 610, 382, 387, 388, 396; 428/920, 921, 402.2, 402.24; 106/15.05, 18.11, 14.05, 14.11, 14.21, 18.13, 18.3; 169/46, 65

[56] References Cited

U.S. PATENT DOCUMENTS

| | | | |
|---|---|---|---|
| 914,233 | 3/1909 | Breslauer | 252/7 |
| 1,278,714 | 9/1918 | Mork | 252/7 |
| 1,278,715 | 9/1918 | Mork | 252/7 |
| 1,278,716 | 9/1918 | Mork | 252/7 |
| 1,393,236 | 10/1921 | Mork | 252/7 |
| 1,716,476 | 6/1929 | Austin | 252/7 |
| 1,813,367 | 7/1931 | Thompson | 252/2 |
| 1,908,398 | 5/1933 | Beythein | 252/7 |
| 2,308,845 | 1/1943 | White | 252/7 |
| 3,274,105 | 9/1966 | Mevel | 252/2 |
| 3,660,321 | 5/1972 | Praetzel et al. | 428/402.2 |
| 3,852,401 | 12/1974 | Suzuki et al. | 264/182 |
| 4,234,432 | 11/1980 | Tarpley, Jr. | 252/7 |
| 4,342,665 | 8/1982 | Itoh et al. | 252/3 |
| 4,546,612 | 10/1985 | Santhanam | 406/154 |
| 4,560,485 | 12/1985 | Szekely et al. | 252/7 |

*Primary Examiner*—Stephen J. Lechert, Jr.
*Assistant Examiner*—Howard I. Locker
*Attorney, Agent, or Firm*—Hurt, Richardson, Garner, Todd & Cadenhead

[57] ABSTRACT

A fire extinguishing composition including potassium carbonate, a boron-containing compound, and water. In another embodiment, the fire extinguishing composition, in addition to the above, includes a potassium salt of an organic acid having from 1 to 6 carbon atoms. The fire extinguishing composition is non-corrosive to metals.

15 Claims, No Drawings

FIRE EXTINGUISHING COMPOSITION

CROSS-REFERENCE TO RELATED APPLICATION

The present application is a continuation-in-part of application Ser. No. 843,763, filed Mar. 26, 1986, (now abandoned).

BACKGROUND OF THE INVENTION

The present invention relates to an improved fire extinguisher composition that is non-corrosive to metals such as aluminum, copper, and steel. The composition of the invention further has minimum volatility and excellent reignition protection.

Numerous types of fire extinguishing compounds are known, such as carbon dioxide, liquid extinguishing compounds, and various powder sprays. Liquid compounds are generally corrosive to metals. This is of particular concern in extinguishing fires on a cooking surface, such as a stove top. Specifically, even if the fire is successfully extinguished, the stove top, which is invariably a metal surface, may be damaged due to corrosion.

Most stove-top fires result from the ignition of cooking grease. When extinguishing grease fires of the type wherein a pan of grease, or any other grease-bearing flammable medium, bursts into flame, the various methods of extinguishment consisting of fully covering the flaming body of grease with a coating of fire extinguishing agent applied by spraying. This has required a person to aim the fire extinguishing material, or if the material were being applied by an automatic apparatus, the latter would have to cover a relatively large expanse. If the fire extinguishing material did not completely cover the fire, the fire was not effectively extinguished.

There is thus a need in the art for a liquid fire extinguishing composition which is not corrosive to metals, for example, cooking equipment and utensils. There is also a need in the art for a fire extinguishing composition which is capable of extinguishing grease fires without the need for completely covering the fire.

DISCLOSURE OF THE INVENTION

It is accordingly an object of the present invention to provide a fire extinguishing composition which is not corrosive to metals.

It is another object of the invention to provide a fire extinguishing composition, as above, which is effective in extinguishing grease fires.

These objects, and others described hereinafter, are achieved by an aqueous fire extinguishing solution, which comprises water, potassium carbonate, and a boron-containing compound, wherein the potassium carbonate and the boron-containing compound are dissolved in the water to form the aqueous solution, the solution being sprayable on the fire.

The objects of the invention are also achieved by an aqueous fire extinguishing solution, which comprises potassium carbonate, a boron-containing compound, a potassium salt of an organic acid, and water, wherein the potassium carbonate, the boron-containing compound and the potassium salt of the organic acid are dissolved in the water to form the aqueous solution, the solution being sprayable on a fire.

DETAILED DESCRIPTION OF THE PREFERRED EMBODIMENTS

In one embodiment of the invention, an improved fire extinguishing composition comprises a mixture of potassium carbonate, a boron-containing compound, and water. In another embodiment, the composition, in addition to the above, contains a potassium salt of an organic acid. It has been found that when either of these compositions are applied to a stove-top fire, such as a grease fire, or to a charcoal fire, the fire is immediately extinguished.

By dispensing a relatively small amount of the improved fire extinguishing material onto a small portion of a flaming pan of grease, or an expanse of grease which is burning, the flames will be extinguished immediately because of the interaction of the material with the grease and the spray of the material over the surface of the grease. It is believed that the placement of a small area of fire extinguishing compound into a large expanse of grease causes a matrix barrier blanketing composition to be formed which seeks out grease and flame, then covers the entire expanse of grease The flames are thus extinguished by shutting off the oxygen supply as well as interfering with the chemical reaction of rapid oxidation. The composition is capable of ascending an incline in order to seek out and blanket hot grease.

In the first embodiment of the invention, which comprises water, potassium carbonate and the boron-containing compound, the potassium carbonate is present in an amount of between about 20% and 40% by weight, more preferably between about 25% and 26% by weight and most preferably between about 30% and 42% by weight.

The boron-containing compound is preferably boric acid, but it may be any other suitable boron-containing material in addition to or in place of boric acid, including ammonium, sodium, potassium, calcium, iron and zinc borates, boron phosphate, boron and boron oxide. Where the boron-containing compound of the first embodiment is boric acid, it is present in an amount of between about 0.5% and about 10% by weight, more preferably between about 2% and 8% by weight, and most preferably between about 3% and 6% by weight, the remaining portion being water. When one or more of the other boron compounds are used in addition to, or in place of the boric acid, the quantity should be such as to provide an amount of boron equivalent to the amount that will be provided by the amounts of boric acid disclosed above. In other words, one or more of the other boron compounds listed above can be substituted in whole or in part for the foregoing quantities of boric acid, provided that the amounts employed contain the ratio equivalent stoichiometric quantities of boron that will be present in the above-disclosed amounts of boric acid.

Converting the above amounts of boric acid to a boron basis, the amount of boron is between about 0.085% and about 1.7% by weight, more preferably between about 0.34% and about 1.36% by weight, and most preferably between about 0.51% and about 1.02% by weight.

In the second embodiment which includes the potassium salt of the organic acid, the potassium carbonate portion is present in an amount of between about 20% and about 47% by weight, more preferably between about 25% and about 26% by weight, and most preferably between about 30% and about 42% by weight. The potassium salt of the organic acid is present in an amount of between about 5% and about 30% by weight, more preferably between about 12% and about 25% by weight, and most preferably between about 17% and about 22% by weight.

Where the boron-containing material is boric acid, the boric acid portion of the composition is present in an amount of between about 0.4% and 10% by weight, more preferably between about 2% and about 8% by weight, and most preferably between about 3% and about 6% by weight.

As with the first embodiment, the same stoiciometric amounts of boron must be maintained if a boron-containing compound other than boric acid is used. Converting the above amounts of boric acid to a boron basis, the amount of boron is between about 0.068% to about 1.7% by weight, more preferably between about 0.34% and about 1.36% by weight, and most preferably between about 0.51% and about 1.02% by weight.

The potassium salts of organic acids are preferably potassium acetate, potassium tartrate or potassium citrate, but can generally be an acid salt having from 1 to 6 carbon atoms, and having a minimum solubility of about 150 g/100 ml. cold water.

If there is an excess of the boron-containing material or the potassium salt of the organic acid, in the solution, it will remain in undissolved form. This will not, however, affect the fire extinguishing capabilities of the remainder of the solution. The solution composition must reach a saturated condition for the most preferred or effective fire extinguishing action.

The solution may be dispensed from a pressurized can or a mechanical pump or any other device from which the solution can be projected. It has been found that the fire extinguishing solution is non-corrosive, that is, it will not corrode aluminum, copper steel or other metallic surfaces to which it has been applied during a fire extinguishing action, nor will it corrode metallic containers or piping used for containing or dispensing the solution. By contrast, most prior art aqueous fire extinguishing compositions have tended to dissolve metal.

Furthermore, in spite of the fact that the composition is in aqueous form, it will not cause detrimental splattering when it is applied to, and reacts with, a flaming oil or grease. Rather, the composition forms a flow-controlled pasty matrix, in which the composition is spread rapidly across the surface of the grease fire to rapidly extinguish it. A thick crust forms on the surface of the grease after extinguishment, which protects the surface from flashback.

A composition of boric acid, water and potassium carbonate which has been found particularly effective comprises 40% by weight potassium carbonate, 2.5% by weight boric acid, and 56.5% by weight water.

A preferred composition incorporating the potassium salt of organic acid comprises 33.33% by weight potassium carbonate, 2.2% by weight boric acid, and 17.02% by weight potassium acetate, and the remaining water.

The following examples illustrate the invention. Table 1 summarizes the compositions and results from the examples.

EXAMPLE 1

An aqueous composition containing 100 parts of 47% potassium carbonate in water was mixed with 14 parts of water, 24 parts of potassium acetate and 3 parts of boric acid. All components dissolved upon mixing; however, less than 1% by weight of precipitate formed upon refrigeration below 32° F. This indicates that the solution was a nearly saturated mixture. Three pounds of the composition were applied to and extinguished 16 separate grease fires. The fires were preburned for one minute to two and one half minutes in pans of 4" diameter with oil 1¼" deep, 13¼" diameter with ¼" of oil, and 11" diameter with 4" of oil, placed on top of a conventional stove. Instantaneous knock down of the flames occurred with minimum volatility. High volatility is considered to be detrimental to effective extinguishment under all circumstances. The residual aqueous composition would flow and seek involvement to react with any remaining hot grease or flame to form a pasty matrix barrier. This stable barrier would extinguish, seal and protect against reignition. It was estimated by Underwriters Laboratory that only 20% of the composition was required for extinguishment. The aqueous composition will attack a three dimensional fire involvement including flowing up a nominal 10° incline. The composition and resulting reaction products from the fire were corrosive neither to aluminum and copper components utilized to apply the composition nor to the stove and pans involved in the fire.

EXAMPLE 2

An aqueous composition containing 100 parts of 47% potassium carbonate in water was mixed with 15 parts water, 10 parts potassium acetate and 3.5 parts of boric acid. Three pounds of the composition were applied to and extinguished grease fires. Instantaneous knock down of the flames occurred with moderate volatility. Minimum flowability, stability and protection against reignition occurred. The composition and resulting reaction products were corrosive neither to aluminum and copper components utilized to apply the composition nor to the stove and pans involved in the fire.

EXAMPLE 3

An aqueous composition containing 10 parts of 47% potassium carbonate in water was mixed with 50 parts of water, 50 parts of potassium acetate and 3.5 parts of boric acid. Three pounds of the composition were applied to and extinguished grease fires. Moderate knock down of the flames but with limited volatility occurred. Stability of the barrier matrix occurred but protection against reignition was moderate. The composition and resulting reaction products were corrosive to neither aluminum and copper components utilized to apply the composition nor to the stove and pans involved in the fire.

EXAMPLE 4

An aqueous composition containing 80 parts of 47% potassium carbonate in water was mixed with 50 parts of water and 3.5 parts of boric acid. Three pounds of the composition were applied to and extinguished grease fires. Instantaneous knock down occurred. Excessive volatility, minimum flowability, stability and protection against reignition occurred. The composition and resulting reaction products were corrosive to neither aluminum and copper components utilized to apply the composition nor to the stove and pans involved in the fire.

EXAMPLE 5

An aqueous composition containing 100 parts of 47% potassium carbonate in water was mixed with 15 parts of water and 1.5 parts of boric acid. Slight corrosion of aluminum wire was apparent within a seven day period. No corrosion was evident on aluminum wire when two parts or more boric acid were mixed with the aqueous composition.

EXAMPLE 6

An aqueous composition containing 100 parts of 47% potassium carbonate in water was mixed with 15 parts of water and 25 parts of potassium acetate. No boric acid was added. Instantaneous corrosion occurred on aluminum wire and the wire was completely dissolved within a seven day period of time.

EXAMPLE 7

An aqueous composition containing 100 parts 47% potassium carbonate in water was mixed with 15 parts of water and 5.5 parts of sodium borate or borax. No corrosion occurred on aluminum wire after standing for over a two month period of time.

Other boron containing compounds such as potassium tetraborate but not limited to this boron-containing compound were mixed in parts equivalent to the stoichiometric quantity of 3.5 parts of boric acid. They were found non-corrosive to aluminum wire over extended periods of time. Excessive quantities of boron containing compounds are not considered detrimental to the environment preventing corrosion nor to the fire extinguishing properties of the composition. Excess boron containing materials will precipitate as a solid in the composition.

EXAMPLE 8

The same procedure as Example 1 was followed, except that potassium formate was substituted for the potassium acetate of Example 1. Instantaneous knock down occurred. Volatility was minimum. Matrix barrier and flow were moderate and the composition was non-corrosive over an extended period.

TABLE 1

| EXAMPLE # | COMPONENT | PERCENT | RESULTS |
|---|---|---|---|
| 1. | Potassium Carbonate | 33.33 | Instantaneous knock down. |
| | Water | 47.51 | Minimum volatility. |
| | Potassium Acetate | 17.02 | Excellent matrix barrier and flow. |
| | Boric Acid | 2.12 | Excellent reignition protection. Non-corrosive over extended period. |
| 2. | Potassium Carbonate | 36.57 | Instantaneous knock down. |
| | Water | 52.91 | Moderate volatility. |
| | Potassium Acetate | 7.78 | Minimum matrix barrier and flow. |
| | Boric Acic | 2.72 | Moderate reignition protection. Non-corrosive over extended period. |
| 3. | Potassium Carbonate | 4.14 | Moderate knock down. |
| | Water | 48.72 | Limited volatility. |
| | Potassium Acetate | 44.28 | Moderate matrix barrier and flow. |
| | Boric Acid | 3.08 | Limited reignition protection. Non-corrosive over extended period. |
| 4. | Potassium Carbonate | 28.16 | Instantaneous knock down. |
| | Water | 69.21 | Excessive volatility. |
| | Boric Acid | 2.62 | Minimum matrix barrier and flow, minimum reignition. Non-corrosive over extended period. |
| 5. | Potassium Carbonate | 40.34 | Limited corrosion on partially immersed aluminum wire within seven days. |
| | Water | 58.36 | |
| | Boric Acid | 1.28 | |

TABLE 1-continued

| EXAMPLE # | COMPONENT | PERCENT | RESULTS |
|---|---|---|---|
| 6. | Potassium Carbonate | 33.57 | Instantaneous corrosion on immersed aluminum wire, completely dissolved in seven days. |
| | Water | 48.57 | |
| | Potassium Acetate | 17.95 | |
| 7. | Potassium Carbonate | 39.00 | Non-corrosive over extended period |
| | Water | 56.43 | |
| | Sodium Borate (Borax) | 4.58 | |
| 8. | Potassium Carbonate | 33.33 | Instantaneous knock down. |
| | Water | 47.51 | Minimum volatility. |
| | Potassium Formate | 17.02 | Moderate matrix barrier and flow. |
| | Boric Acid | 2.12 | Non-corrosive over extended period. |

What is claimed is:

1. A non-corrosive aqueous fire extinguishing solution, comprising water, potassium carbonate, boron or a boron-containing compound selected from the group consisting of elemental boron, boric acid, ammonium borate, potassium borate, calcium borate, iron borate, zinc borate, boron phosphate, and boron oxide, and a potassium salt of an organic acid, wherein said potassium carbonate and said boron-containing compound are dissolved in said water to form the aqueous solution, said solution being sprayable on a fire.

2. A solution as claimed in claim 1, wherein the amount of said potassium carbonate is between about 20% and 40% by weight, the amount of boron, in the form of said boron compound, is from about 0.085% to about 1.7% by weight, the remainder being water.

3. A solution as claimed in claim 1, wherein the amount of said potassium carbonate is from about 25% to about 46% by weight, the amount of said boron is from about 0.34% to about 1.36% by weight, the remainder being water.

4. A solution as claimed in claim 1, wherein the amount of said potassium carbonate is between about 30% and about 42% by weight, the amount of said boron is between about 0.51% and about 1.02% by weight, the remainder being water.

5. A solution as claimed in claim 1, including: from about 20% to about 47% by weight potassium carbonate; from about 0.68% to about 1.7% by weight of boron in the form of said boron-containing compound; from about 5 to about 30% by weight of a potassium salt of an organic acid; and the remainder being water.

6. A solution as claimed in claim 5, wherein said potassium salt has between 1 and 6 carbon atoms.

7. A solution as claimed in claim 6, wherein said potassium salt of an organic acid has a minimum solubility in cold water of 150 g./100 ml.

8. A solution as claimed in claim 1, wherein said potassium salt of an organic acid is selected from the group consisting of potassium acetate, potassium tartrate and potassium citrate.

9. A solution as claimed in claim 8, wherein said solution comprises: from about 25% to about 46% by weight potassium carbonate; from about 0.34% to about 1.36% by weight of boron in the form of said boron-containing compound; from about 0.2% to about 25% by weight of said potassium salt of an organic acid; and the remainder being water.

10. A solution as claimed in claim 9, wherein said composition comprises: from about 30% to about 42% by weight potassium carbonate; from about 0.51% to about 1.02% by weight of boron in the form of said boron-containing compound; from about 0.17% to about 22% by weight of said potassium salt of an organic acid; and the remainder being water.

11. A non-corrosive, aqueous grease fire extinguishing solution, comprising water, potassium carbonate, boron or a boron-containing compound selected from the group consisting of elemental boron, boric acid, ammonium borate, potassium borate, calcium borate, iron borate, zinc borate, boron phosphate and boron oxide, and a potassium salt of organic acid, said boron or boron-containing compound being present in a saturated condition in said solution and dissolved therein in sufficient quantities to precipitate slightly, said solution being sprayable on a fire.

12. A solution as claimed in claim 11, including: from about 20% to about 47% by weight potassium carbonate; from about 0.68% to about 1.7% by weight of boron in the form of said boron-containing compound; from about 5 to about 30% by weight of a potassium salt of an organic acid; and the remainder being water.

13. A solution as claimed in claim 12, wherein said potassium salt has between 1 and 6 carbon atoms.

14. A solution as claimed in claim 13, wherein said potassium salt of an organic acid has a minimum solubility in cold water of 150 g./100 ml.

15. A solution as claimed in claim 14, wherein said potassium salt of organic acid is selected from the group consisting of potassium acetate, potassium tartrate and potassium citrate.

* * * * *